(12) United States Patent
Mollard et al.

(10) Patent No.: US 12,189,116 B2
(45) Date of Patent: Jan. 7, 2025

(54) OPTICAL SCANNER

(71) Applicant: COMMISSARIAT A L'ENERGIE ATOMIQUE ET AUX ENERGIES ALTERNATIVES, Paris (FR)

(72) Inventors: Laurent Mollard, Grenoble (FR); Christel Dieppedale, Grenoble (FR); Stéphane Fanget, Grenoble (FR); Daivid Fowler, Grenoble (FR); Jean Hue, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 722 days.

(21) Appl. No.: 17/304,871

(22) Filed: Jun. 28, 2021

(65) Prior Publication Data
US 2022/0003987 A1 Jan. 6, 2022

(30) Foreign Application Priority Data

Jul. 1, 2020 (FR) ..................................... 20 06927

(51) Int. Cl.
*G02B 6/10* (2006.01)
*G02B 26/10* (2006.01)
*G02B 27/42* (2006.01)

(52) U.S. Cl.
CPC ............ *G02B 26/101* (2013.01); *G02B 6/10* (2013.01); *G02B 27/4233* (2013.01)

(58) Field of Classification Search
CPC .. G02B 26/101; G02B 27/4233; G02B 26/06; G02B 26/103; G02B 26/106; G02B 27/0087; G02B 6/10
See application file for complete search history.

(56) References Cited

U.S. PATENT DOCUMENTS

2010/0232833 A1* 9/2010 Fujii .................... G02B 26/105
359/201.1
2022/0252868 A1* 8/2022 Sarkar .................. G02B 26/106
2023/0047931 A1* 2/2023 Borden .................. G02B 27/30

FOREIGN PATENT DOCUMENTS

FR 2 923 092 A1 5/2009
WO WO-2018222727 A1 * 12/2018

OTHER PUBLICATIONS

French Preliminary Search Report issued Feb. 17, 2021 in French Application 20 06927 filed on Jul. 1, 2020, citing documents AO-AP & AX therein, 2 pages (with English Translation of Categories of Cited Documents).
Holmstrom et al., "MEMS Laser Scanners: A Review", Journal of Microelectromechanical Systems, vol. 23, No. 2, Apr. 2014, pp. 259-275.
Defay. "Integration of Ferroelectric and Piezoelectric Thin Films", Section 13.5.3, Mar. 14, 2011, 56 pages.
Sun et al., "Large-scale nanophotonic phased array", Nature, 11727, vol. 493, Jan. 10, 2013, pp. 195-199.

* cited by examiner

*Primary Examiner* — Eric Wong
(74) *Attorney, Agent, or Firm* — Oblon, McClelland, Maier & Neustadt, L.L.P.

(57) ABSTRACT

A scanner provided with a plurality of elementary scanners, especially two elementary scanners, referred to as a first and second scanner respectively. In particular, the first scanner and the second scanner are arranged to scan, each with an optical beam, respectively, a first surface and a second surface included in the first surface and of a smaller extent than the latter.

18 Claims, 7 Drawing Sheets

OPTICAL SCANNER

TECHNICAL FIELD

The present invention is concerned with the field of micro opto-electromechanical systems ("MOEMS"). In particular, the present invention relates to an optical scanner provided with at least two elementary scanners, referred to as, respectively, first scanner and second scanner arranged to scan the surrounding space of the optical scanner each by means of an extracted beam obtained from a main optical beam and with a different optical resolution. Especially, the first scanner and the second scanner are arranged to scan, by means of the extracted beams, a first surface and a second surface, the second surface being of smaller extent than the first surface and included in the first surface.

STATE OF PRIOR ART 2D scanners or micro-scanners are devices that allow a light beam to scan a scene in one or even two dimensions. These scanners can especially be implemented in LIDAR (Light Detection And Ranging systems) type devices for detection or imaging purposes.

In practice, scanning a surface or an object by a light beam can be achieved by means of one or more movable micro-mirrors.

In this respect, FIG. 1 (taken from document [1] listed at the end of the description) illustrates a first possible architecture of such a device provided with two micro-mirrors, respectively referred to as first micro-mirror 11 and second micro-mirror 21, arranged to pivot about, respectively, a first pivot axis $X_1X_1'$ and a second pivot axis $Y_1Y_1'$ non-parallel to each other. In particular, these two micro-mirrors $1_1$ and $2_1$ are arranged so that a light beam emitted by a light source $3_1$ is reflected by the first micro-mirror $1_1$ in the direction of the second micro-mirror $2_1$, which in turn reflects it in the direction of a screen $4_1$, for example. The rotation of each of the micro-mirrors $1_1$ and $2_1$ about their respective pivot axis thus makes it possible to scan a surface with the light beam, for example for imaging or detection purposes.

However, such an architecture is not satisfactory.

Indeed, due to the presence of two micro-mirrors, the latter is of low compactness.

Furthermore, this architecture requires precise alignment of the two micro-mirrors and is consequently difficult to achieve.

Finally, the micro-mirrors are also likely to be damaged, especially through heating induced by the light beam.

In order to partly alleviate these problems, a second architecture, illustrated in FIG. 2 (taken from the document [1] listed at the end of the description), can be contemplated. The latter implements a single micro-mirror $1_2$ pivotably mounted about two non-parallel axes $X_2X_2'$ and $Y_2Y_2'$.

The oscillation of this micro-mirror $1_2$ about both pivot axes $X_2X_2'$ and $Y_2Y_2'$ thus makes it possible to scan the surface of a screen $4_1$ by means of a light beam from a light source $3_2$ and reflected by said micro-mirror $1_2$.

However, this second architecture is not satisfactory either.

Indeed, like the first architecture, the micro-mirror $1_2$ is also likely to be heated by the light beam.

Furthermore, this second architecture is also sensitive to alignment of the light source $3_2$ and the micro-mirror $1_2$. The alignment between these two elements is especially sensitive to shocks suffered by the device but also to temperature and pressure conditions imposed to the latter.

Further, oscillations of the micro-mirror about both pivot axes $X_2X_2'$ and $Y_2Y_2'$, induced by an actuator, are never decoupled so that mechanical crosstalk is likely to occur.

As an alternative to the architectures set forth above, 2D micro-scanners with an optical phased array (OPA) transmitter or optical phased array have been provided.

These can comprise a plurality of optical sources each capable of emitting light radiation. Each of these optical sources is moreover associated with phase modulation means for phase shifting optical radiations with respect to each other so as to vary the angle of propagation of the combined radiation emitted by all the optical sources. According to one advantageous configuration, the optical sources can be derived from a same main source.

This principle of operation can be extrapolated to a 2D matrix of optical sources allowing an optical beam to be scanned along two different directions, for example perpendicular with respect to each other.

However, these devices are not satisfactory either.

Indeed, such a device remains restrained to an optical resolution imposed thereto by its design, and which consequently makes it of low flexibility in use. In particular, such a device does not allow a given surface, or a zone of said surface, to be scanned at different optical resolutions, for example for analysis purposes.

Therefore, a purpose of the present invention is to provide a light scanning device which has flexibility in terms of optical resolution, and/or extent of surface scanned.

A further purpose of the present invention is to provide a light scanning device which has an appreciable compactness.

DISCLOSURE OF THE INVENTION

The purposes of the invention are, at least partly, achieved by an optical scanner which comprises:
  an optical source capable of emitting a main optical beam;
  at least two elementary scanners, respectively referred to as first and second scanners, and which comprise respectively:
  a first and a second beam provided, respectively, with a first and a second movable part on the one hand, and a first and a second fixed part on the other hand;
  a first and a second actuator arranged to impose flexion or torsion, respectively, to the first and the second movable parts;
  a first and a second optical phased array arranged on or in the first and the second movable parts, respectively, and at which the main optical beam is partly extracted, as a first and a second beam, respectively;
  the first and second scanners being arranged to scan, along a first and a second direction, by means of the first and second beams, respectively, a first and a second surface, the second surface being of a smaller extent than the first surface and included in the first surface.

According to one implementation, the first and second beams are arranged so that the flexion of both beams allows, respectively, the first and second beams to scan, respectively, the first and second surfaces along the first direction, according to, respectively, a first and a second range of longitudinal angles, the first range of longitudinal angles having a greater extent than that of the second range of longitudinal angles.

According to one implementation, the first and second movable parts are arranged to undergo a flexion of a first and a second amplitude, respectively, the second amplitude being strictly smaller than the first amplitude.

According to one implementation, the first movable part has a thickness, referred to as first thickness, greater than the thickness, referred to as second thickness, of the second movable part.

According to one implementation, the first movable part has a length, referred to as first length, smaller than the length, referred to as second length, of the second beam.

According to one implementation, the first movable part has a resonant vibration frequency, referred to as first frequency, greater than the resonant vibration frequency, referred to as second frequency, of the second movable part.

According to one implementation, the first and second scanners comprise, respectively, a first and a second plurality of waveguides arranged on or in, respectively, the first and second movable parts, each of the plurality of waveguides being for dividing the main optical beam into, respectively, a first and a second plurality of secondary optical beams.

According to one implementation, the first plurality of waveguides comprises a smaller number of waveguides than that of the second plurality of waveguides.

According to one implementation, the first and second optical phased arrays comprise, respectively, a first and a second plurality of optical phase shifters, each optical phase shifter of the first and second pluralities of optical phase shifters being coupled to a waveguide, respectively, of the first and second pluralities of waveguides, advantageously, the second optical phased array comprises a greater number of optical phase shifters than that of the first optical phased array.

According to one implementation, each optical phase shifter comprises a diffraction grating coupled to phase shifting means for imposing a phase shift to the secondary optical beam from the waveguide to which the optical phase shifter under consideration is optically coupled.

According to one implementation, the first and second phased arrays are arranged to impose scanning, respectively, of the first and second surfaces, by respectively the first and second beams, along the second direction according to, respectively, a first and a second range of lateral angles, the first range of lateral angles having a greater extent than that of the second range of lateral angles.

According to one implementation, the first and second beams each comprise, from a front face to a rear face, a front layer, an intermediate layer and a rear layer.

According to one implementation, the front layer and the rear layer each comprise a dielectric material, the dielectric material advantageously comprises silicon dioxide.

According to one implementation, the first and second actuators are arranged such that the flexion likely to be imposed to both the first and second movable parts is carried out in a plane perpendicular to a main face, respectively, of the first and second beams.

According to one implementation, the first and second actuators are arranged so that the torsion likely to be imposed to both the first and second movable parts is carried out about an axis of elongation, respectively, of the first and second beams.

According to one implementation, the first and second actuators each comprise at least one of the means selected from: electrostatic means, magnetic means, piezoelectric means, thermal means.

According to one implementation, said optical scanner also comprises a support on a main face of which the first and second beams rest through the first and second fixed parts.

BRIEF DESCRIPTION OF THE DRAWINGS

Further characteristics and advantages will become apparent in the following description of an optical scanner according to the invention, given by way of non-limiting examples, with reference to the appended drawings in which.

DETAILED DISCLOSURE OF PARTICULAR EMBODIMENTS

The present invention relates to a scanner provided with a plurality of elementary scanners, especially two elementary scanners, referred to as first and second scanners respectively. In particular, the first scanner and the second scanner are arranged to scan, each with an optical beam, respectively, a first surface and a second surface included in the first surface and of a smaller extent than the latter.

Figure 1:
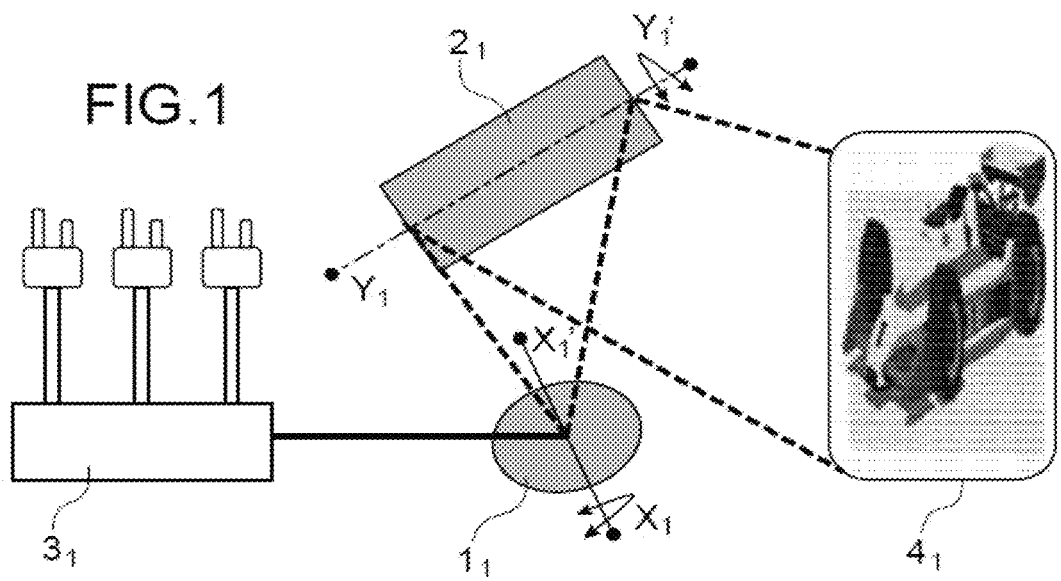
FIG. 1 illustrates a first architecture of a light scanning device known from the state of the art, the device especially comprises two micro-mirrors each pivotably mounted about a different and non-parallel pivot axis.
Figure 2:
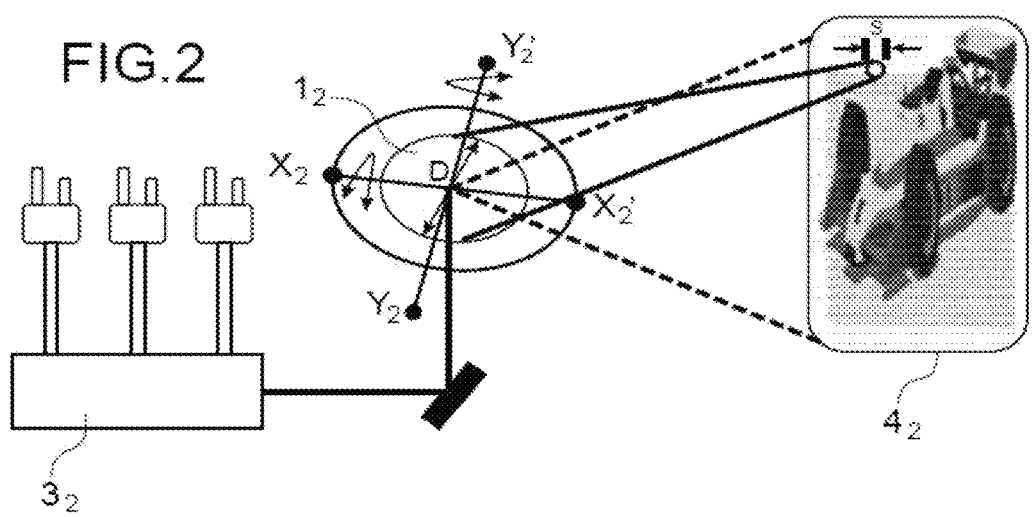
FIG. 2 illustrates a second architecture of a light scanning device known from the state of the art, the device especially comprises a micro-mirror pivotably mounted about two different and non-parallel pivot axes.
Figure 3:
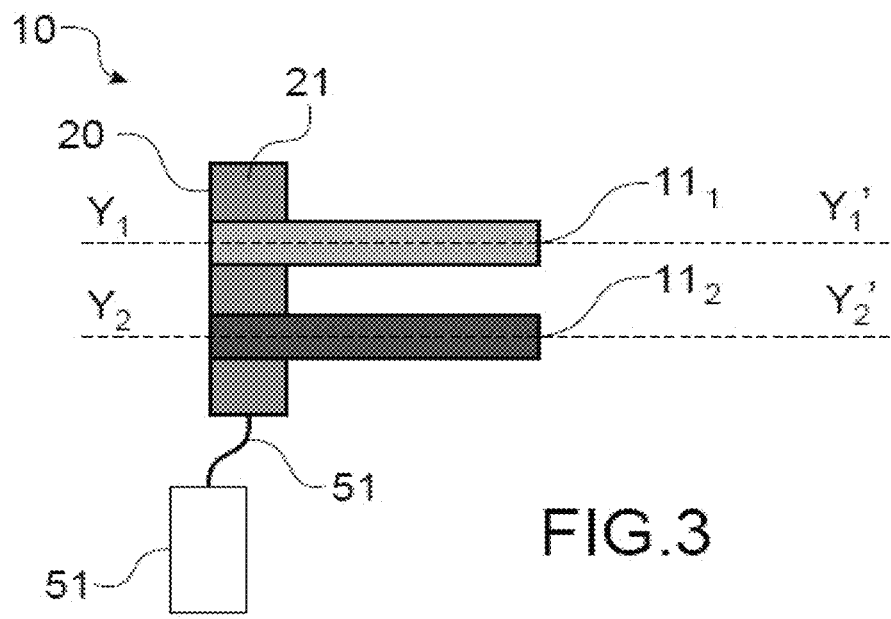
FIG. 3 is a schematic representation of one exemplary implementation of an optical scanner according to the present invention as seen vertically from the main face.

Thus, FIG. 3 schematically illustrates an example of an optical scanner 10 according to the present invention.

The scanner 10 especially comprises a fixed support 20 provided with a main face 21. The support can especially be obtained from a semiconductor substrate, for example silicon.

The optical scanner 10 also comprises at least one optical source 50 capable of emitting a main optical beam.

The main optical beam is advantageously quasi-monochromatic or even monochromatic. The optical source 50 can for example comprise a LASER source.

The wavelength λ can be between 400 nm and 2500 nm, for example equal to 905 nm, or equal to 1330 nm or equal to 1550 nm.

Figure 4A:
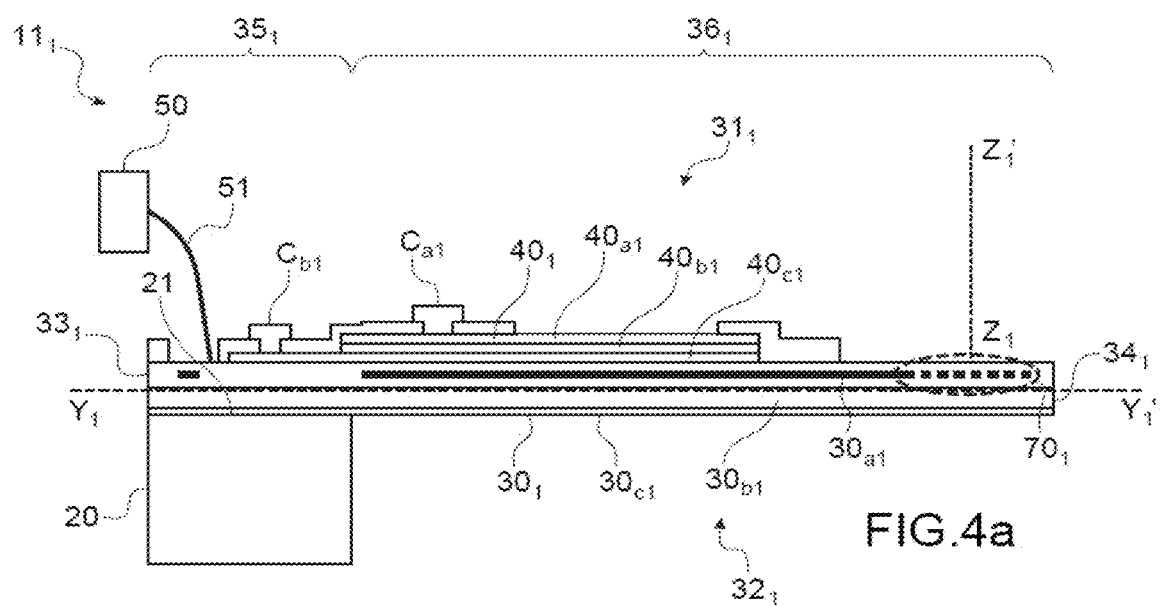
FIG. 4*a* is a schematic representation of an elementary scanner, referred to as first scanner, in a section plane perpendicular to the first front face and comprising the first axis Y1Y1' according to the present invention.
Figure 4B:
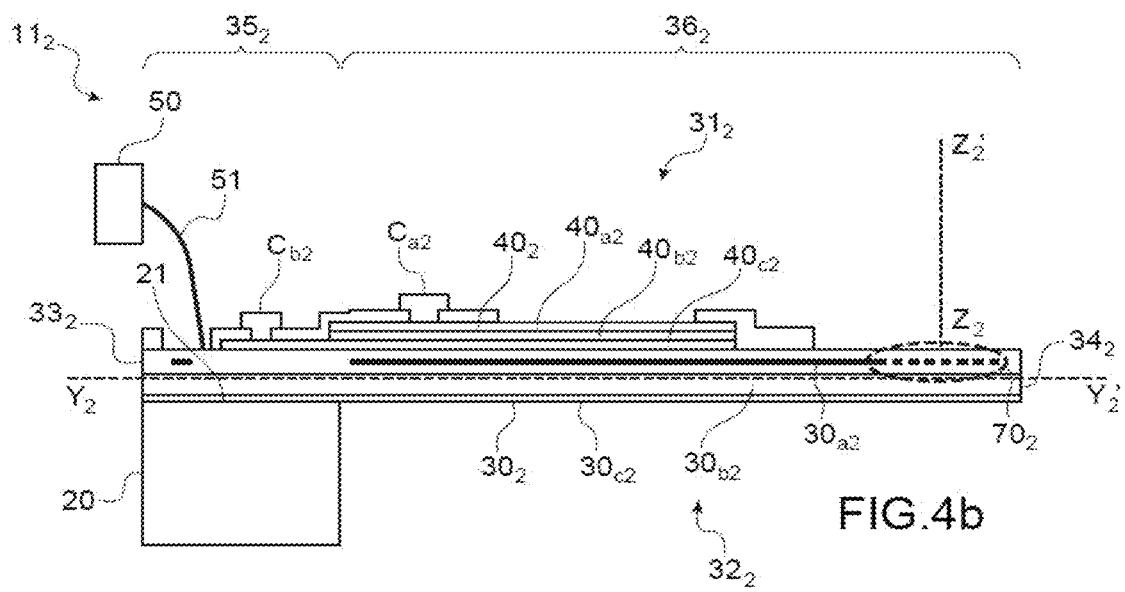
FIG. 4*b* is a schematic representation of an elementary scanner, referred to as second scanner, in a section plane perpendicular to the second front face and comprising the second axis $Y_2Y_2'$ according to the present invention.

The optical scanner 10 also comprises at least two elementary scanners 11 referred to as first $11_1$ and second $11_2$ scanners respectively (FIGS. 4a and 4b).

It will be obvious from the following description that the invention is not limited to two elementary scanners.

The first $11_1$ and second $11_2$ scanners each comprise a beam referred to as first beam $30_1$ and second beam $30_2$ respectively.

A beam typically has an elongate shape. More particularly, a beam, according to the present invention, extends, along an axis of elongation, between two ends referred to as, respectively, fixed end and free end. More precisely, the first beam 30₁ extends, along a first axis $Y_1Y_1'$, from a first fixed end 33₁ towards a second fixed end $34_1$. Equivalently, the second beam $30_2$ extends, along a second axis $Y_2Y_2'$, from a second fixed end $33_2$ to a second free end $34_2$.

Furthermore, it is understood that a beam, according to the present invention, is provided with two faces parallel to each other and, referred to as front face and rear face. More precisely, the first beam $30_1$ comprises a first front face $31_1$ and a first rear face $32_1$. Equivalently, the second beam $30_2$ comprises a second front face $31_2$ and a second rear face $32_2$.

A beam can have a thickness of between 1 μm and several hundred μm, a length of between 100 μm and several millimetres, and a width of between 10 μm and several millimetres.

The thickness of the beam is defined as the distance between the front and the rear face. Its length is its dimension measured along the direction defined by the axis of elongation while its width is its dimension measured along a direction perpendicular to that defined by the axis of elongation and the thickness of said beam.

The first axis $Y_1Y_1'$ and second axis $Y_2Y_2'$ are advantageously parallel.

The first $30_1$ and the second $30_2$ beams each comprise a movable part 36, referred to as first movable part $36_1$ and second movable part $36_2$ respectively, as well as a fixed part, referred to as first fixed part $35_1$ and second fixed part $35_2$ respectively. The first $30_1$ and second $30_2$ beams are especially integral with the support 20 through their fixed parts $35_1$ and $35_2$. In particular, the fixed parts $35_1$ and $35_2$ rest on the main face 21.

By "movable part", it is meant a part of the beam that can undergo deformation by flexion. For example, the movable part can undergo flexion along a direction of a plane comprising the axis of elongation and perpendicular to the front face.

Each of the two beams $30_1$ and $30_2$ can comprise, respectively, a first stack and a second stack.

In this respect, the first stack can comprise, from the first front face 31₁ to the first rear face 32₁, a first front layer $30_{a1}$, a first intermediate layer $30_{b1}$, and a first rear layer $30_{c1}$.

Equivalently, the second stack can comprise, from the second front face $31_2$ to the second rear face $32_2$, a second front layer $30_{a2}$, a second intermediate layer $30_{b2}$, and a second rear layer $30_{c2}$.

The first front layer $30_{a1}$, the first rear layer $30_{c1}$, the second front layer $30_{a2}$, and the second rear layer $30_{c2}$ can each comprise a dielectric material. The dielectric material advantageously comprises silicon dioxide.

The first intermediate layer $30_{b1}$ and the second intermediate layer $30b2$, advantageously comprise polycrystalline silicon.

The first $11_1$ and second $11_2$ scanners each comprise an actuator, referred to as first actuator $40_1$ and second actuator $40_2$, respectively. Each of these actuators $40_1$ and $40_2$ is especially arranged to impose flexion or torsion, respectively, to the first movable part 361 and to the second movable part $36_2$.

It is understood that the flexion of a movable part likely to be imposed by an actuator corresponds to a deformation or curvature of said movable part in a plane, referred to as a flexion plane, perpendicular to the front face of the beam, and which comprises its axis of elongation.

Equivalently, a torsion of a movable part corresponds to a deformation of said movable part about its axis of elongation.

Thus, the flexion plane of the first beam $30_1$ is perpendicular to the first front face 311 and comprises the first axis $Y_1Y_1'$.

Equivalently, the flexion plane of the second beam $30_2$ is perpendicular to the second front face $31_2$ and comprises the second axis $Y_2Y_2'$.

An actuator according to the present invention can comprise at least one of the means selected from: electrostatic means, magnetic means, piezoelectric means, thermal means. However, the invention is not limited only to these means.

The actuator can be controlled by control means, for example electronic control means, especially equipped with a microprocessor or a calculator. These control means can especially be adapted to vibrate the beam in flexion. In particular, these control means can impose a vibration to the beam in flexion or in torsion. This vibration can especially have a frequency equal to the resonant frequency of the beam.

The actuator can especially comprise a layer of piezoelectric material interposed between two electrodes for imposing a non-zero electric voltage on either side of said layer of piezoelectric material.

In the example represented in FIG. 4a, the first actuator $40_1$ comprises a first layer of piezoelectric material $40_{b1}$ interposed between a first front electrode $40_{a1}$ and a first rear electrode $40_{c1}$.

Equivalently, in the example represented in FIG. 4b, the second actuator $40_2$, comprises a second layer of piezoelectric material $40_{b2}$ interposed between a second front electrode $40_{a2}$ and a second rear electrode $40_{c2}$.

Furthermore, the first actuator $40_1$ and the second actuator $40_2$ are each provided, respectively, with first contacts $C_{a1}$ and $C_{b1}$ on the one hand, and with two contacts $C_{a2}$ and $C_{b2}$ on the other hand, at which a supply voltage can be applied. This supply voltage can especially be applied with the control means. Under the effect of this electric voltage, the layer of piezoelectric material contracts, and drives the movable part of the beam in flexion. The direction of bending of the layer of piezoelectric material can depend on the sign of the electric voltage imposed by the electrodes, especially when said layer comprises a non-ferroelectric piezoelectric material.

The amplitude of bending can in turn depend on many parameters, including stiffness of the beam, amplitude of the voltage imposed by the electrodes and thickness of the layer of piezoelectric material.

Advantageously, it is possible to vibrate the beam, and more particularly at its resonant frequency, in order to give the scanner a better quality factor, and to benefit from the mechanical quality factor to amplify the movement.

In this respect, the resonant frequency of a beam having length L, width b, thickness h and density ρ and Young's modulus E verifies the following relationship:

$$\left(\frac{E}{\rho}\right)^{1/2} \frac{h}{L^2}$$

Thus, the resonant frequency increases with thickness and decreases when its length increases. However, this decrease depending on the thickness verifies a square law and is therefore more pronounced when the length is changed.

In other words, the resonant frequency of the beam can be adjusted through its thickness and length.

The layer of piezoelectric material can comprise at least one of the materials selected from: PZT (Lead Titano-Zirconate) or AlN (aluminium nitride). Other piezoelectric materials are contemplatable.

Figure 6:
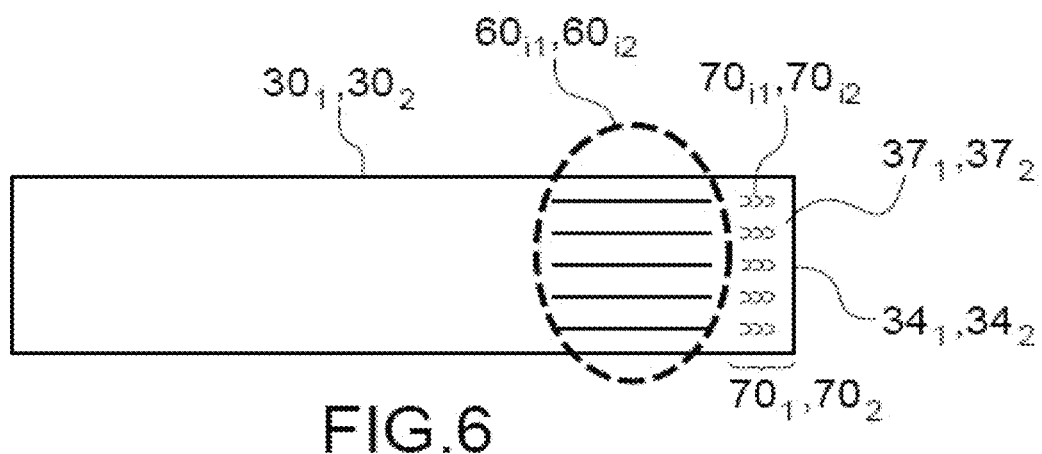
FIG. 6 is a partial representation of an optical scanner as seen vertically from the front face and illustrating an arrangement of waveguides likely to be implemented within the scope of the invention.

The first $11_1$ and second $11_2$ scanners can also each comprise a plurality of waveguides, referred to as first $60_{i1}$ and second $60_{i2}$ pluralities of waveguides, respectively, disposed on or in the first $36_1$ and second $36_2$ movable parts, respectively (FIG. 6). The waveguides illustrated in FIG. 6 are arranged in parallel to the axis of elongation, and such that the ratio of their spacing (in μm) to the wavelength λ (in nm) is between 0.5 and 10.

The waveguides can, for example, be between about 100 microns and 10 millimetres in length, and spaced apart from each other by a distance of between about 100 microns and about 10 millimetres.

Each of the pluralities of waveguides $60_i$ and $60_{i2}$ is especially for dividing the main optical beam into, respectively, a first and a second plurality of secondary optical beams.

Coupling the optical source 50 with the waveguides can be performed with coupling means 51 (FIGS. 3, 4*a* and 4*b*) and especially with one or more optical fibres.

An elementary scanner according to the present invention also comprises an optical phased array disposed in or on the movable part of the elementary scanner from which the main optical beam emitted for the optical source 50 is partly extracted as an extracted beam.

The phased array can be driven by the control means.

Thus, according to the example described in the present invention, the optical phased array of the first scanner $11_1$, referred to as first phased array $70_1$ (FIG. 4*a*), is arranged to allow extraction of the main optical beam as a first beam, while the optical phased array of the second scanner $11_2$, referred to as second optical phased array $70_2$ (FIG. 4*b*), is arranged to allow extraction of the main optical beam as a second beam.

The first optical phased array $70_1$ and second optical phased array $70_2$ each comprise a plurality of phase shifters, referred to as first plurality of phase shifters $70i1$ and second plurality of phase shifters $70_{i2}$ respectively.

Each phase shifter of the first and second pluralities of optical phase shifters is advantageously coupled to a waveguide of the first and second pluralities of waveguides, respectively.

Advantageously, each optical phase shifter $70_{i1}$ and $70_{i2}$ comprises a diffraction grating coupled to phase shifting means for imposing a phase shift on the secondary optical beam from the waveguide to which the optical phase shifter under consideration is optically coupled.

Figure 7:
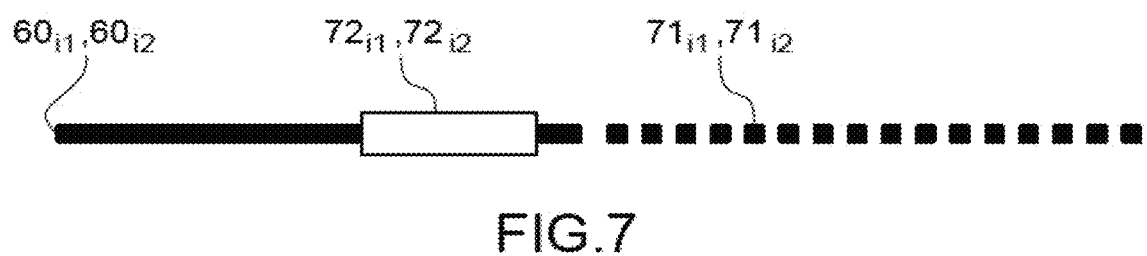
FIG. 7 is an illustration of an optical phase shifter according to a first architecture likely to be implemented within the scope of the invention.

FIG. 7 is an illustration of an optical phase shifter according to a first architecture likely to be implemented within the scope of the invention. In particular, the diffraction grating is formed by studs aligned as an extension of the waveguide, while the phase shifting means can comprise a heating element disposed in vertical alignment with the waveguide and for locally heating the latter in order to modulate its refractive index.

Figure 8:
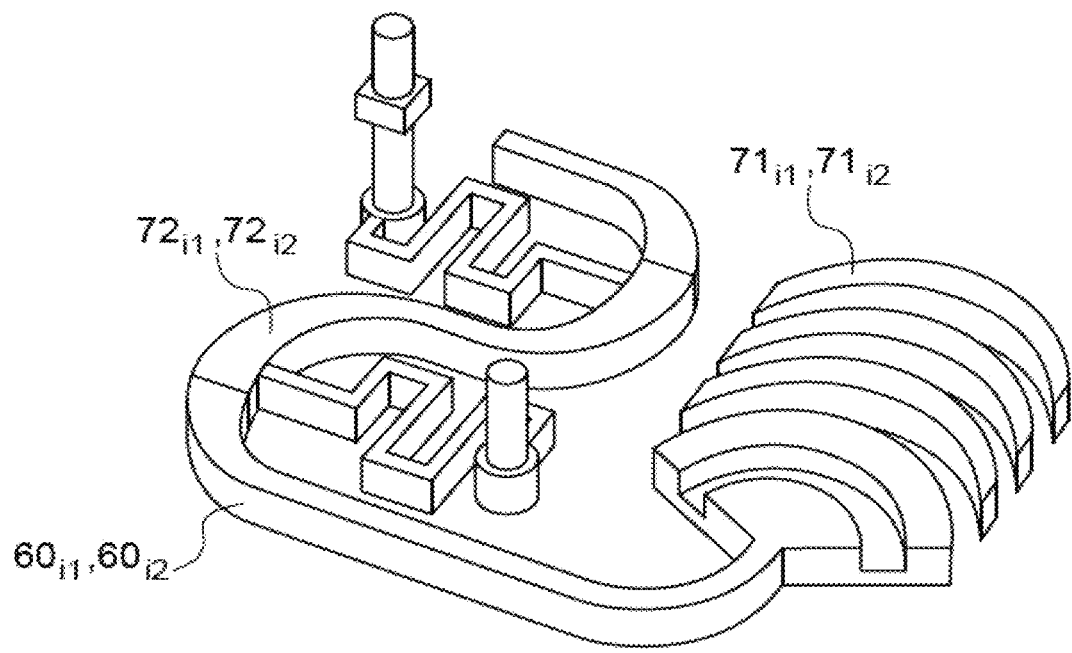
FIG. 8 is an illustration of an optical phase shifter (taken from the document [3] listed at the end of the description) according to a second architecture likely to be implemented within the scope of the present invention.

FIG. 8 is an illustration of an optical phase shifter according to a second architecture likely to be implemented within the scope of the invention. In particular, the diffraction grating is formed by aligned solid arcs, while the phase shifting means can comprise a heating element for locally heating the waveguide $60_i$ in order to modulate its refractive index.

Advantageously, the waveguides and/or diffraction gratings can comprise silicon nitride.

The optical phase shifters can be arranged in line perpendicular to the axis of elongation of the beam.

Alternatively, the optical phase shifters can be arranged in matrix form.

By "arranged in matrix form", it is meant arranged in N rows and M columns. According to this third architecture, an elementary scanner can thus scan the space at two angles of propagation.

Figure 5:
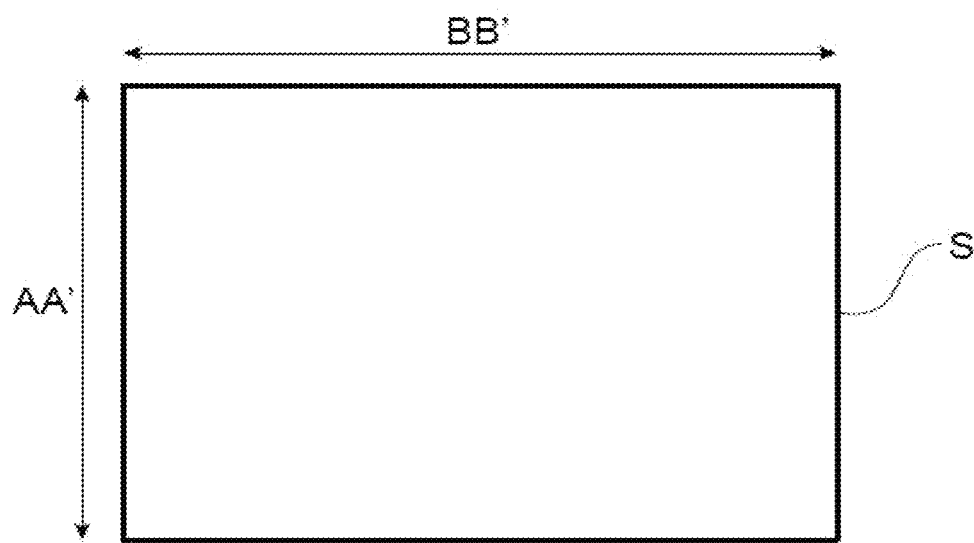
FIG. 5 is a schematic representation of a surface likely to be scanned by an elementary scanner by means of an extracted beam.

An elementary scanner, as described hereinabove, in operation, is thus capable of scanning a surface S by means of the extracted beam. The surface S is represented as a rectangle in FIG. 5. However, the latter can correspond to the surface of an object, and more particularly the surface of a 3-dimensional object.

In particular, scanning said surface can be performed along a first direction AA' and along a second direction BB' (FIG. 5), which can advantageously be perpendicular to each other.

Scanning the surface S along the first direction AA' is especially provided by the flexion of the beam forming the elementary scanner.

In particular, when the beam is at rest, the extracted beam, referred to as rest beam, is emitted along a direction referred to as rest direction (referred to as a first rest direction $Z_1Z_1'$ for the first scanner and second rest direction $Z_2Z_2'$ for the second scanner). The rest position can especially be perpendicular to the front face of the beam at rest.

As a flexion is imposed to the beam, the extracted beam undergoes a deflection, at an angle φ, referred to as longitudinal angle, with respect to the rest direction and in the flexion plane of the elementary scanner considered. In dependence on the structure of the beam, this longitudinal angle can vary within a range of longitudinal angles Δφ imposed by the physical and geometrical parameters of the beam. Thus, the smaller the range of longitudinal angles Δφ, the smaller the extent of the surface S along the first direction AA'.

Scanning the surface S along the second direction BB' is provided by the optical phased array of the elementary scanner. Especially when implemented, the optical phased array imposes a deflection to the extracted beam, at an angle θ, referred to as lateral angle, with respect to the rest direction and in a plane, referred to as lateral plane, perpendicular to the flexion plane and which comprises the rest direction. In dependence on the structure of the optical phased array, this lateral angle can vary within a range of lateral angles Δθ imposed by the physical and geometrical parameters of the optical phased array.

Thus, the smaller the range of lateral angles $\Delta\theta$, the smaller the extent of the surface S along the second direction BB'.

The implementation of a deflection of the extracted beam according to both the range of longitudinal angles $\Delta\varphi$ and the range of lateral angles $\Delta\theta$ thus makes it possible to scan the entire surface S.

Thus, the first scanner $11_1$ is arranged to scan a first surface S1 according to both the first range of longitudinal angles $\Delta\varphi_1$ and the first range of lateral angles $\Delta\theta_1$, while the second scanner $11_2$ is arranged to scan a second surface S2 according to both the second range of longitudinal angles $\Delta\varphi_2$ and the second range of lateral angles $\Delta\theta_2$. This variation in longitudinal angle scanning can be modulated by the bias applied to the piezoelectric material.

Figure 9:
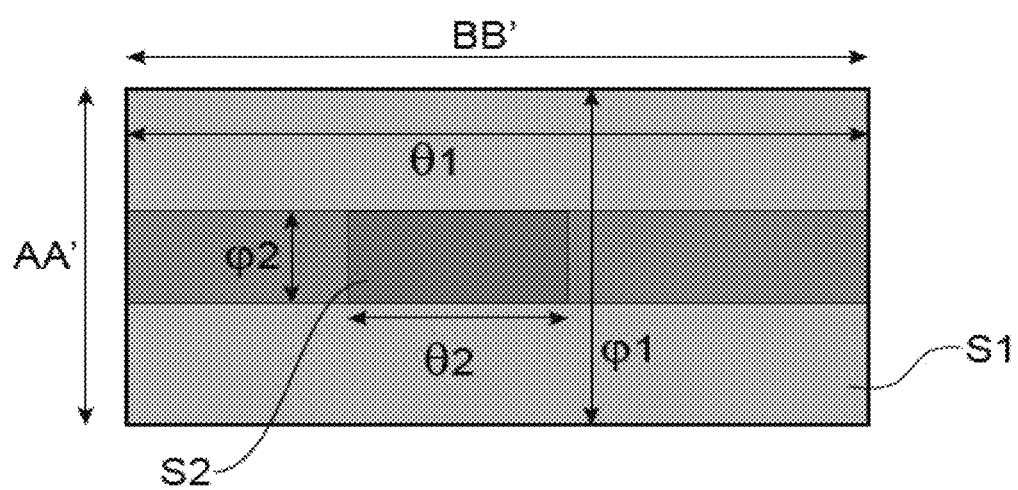
FIG. 9 is an illustration of the first and second surfaces likely to be scanned by the first beam and the second beam respectively.

In particular, and according to the present invention, the second surface S2 has a smaller extent than that of the first surface S1 and is included in the first surface S1 (FIG. 9). In other words, the second scanner $11_2$ is arranged to scan a section of the surface scanned by the first scanner $11_1$. This arrangement thus allows a surface to be scanned, for example for imaging purposes with different levels of resolution, without however affecting compactness of the optical scanner 10.

According to a first implementation, the first scanner $11_1$ and the second scanner $11_2$ are arranged so that the second range of longitudinal angles $\Delta\varphi_2$ is more restricted than the first range of longitudinal angles $\Delta\varphi_1$.

According to a first alternative of this first implementation, this limitation can especially be imposed by a different bias of the beams.

In this respect, and as set out in document [2] listed at the end of the description, the higher the electric bias field imposed to the layer of piezoelectric material (for example a layer of PZT), the greater the flexion of the assembly formed by said layer and the beam. This flexion is dependent not only on the mechanical and geometrical properties of the beam but also on the electric bias field imposed to the layer of piezoelectric material.

According to a second alternative of this first implementation, this limitation can especially be imposed by beams of different lengths in the context of an operation at the resonating frequency.

Indeed, the bending amplitude of a beam, for a given load, is directly proportional to the power of four of its length and inversely proportional to the product of its thickness by its moment of inertia.

In other words, the bending amplitude of a beam increases with its length and/or decreases with its thickness.

Thus, according to this second alternative, the first beam advantageously has a length, referred to as first length L1, smaller than the length, referred to as second length L2, of the second beam.

According to a third alternative or in addition to either or both the first and second alternatives, the first beam advantageously has a thickness, referred to as thickness E1, greater than the thickness, referred to as second thickness E2, of the second beam. Indeed, as previously indicated, the bending amplitude of a beam, for a given load, increases when its thickness decreases. Therefore, for a given load, the bending amplitude of the first beam is smaller than that of the second beam.

The considerations of beam thickness and length also influence their resonant frequency. Indeed, the resonant frequency of a beam is proportional to its thickness and inversely proportional to the square of its length. In other words, within the scope of the second alternative, the first beam also has a higher resonant frequency than that of the second beam. Equivalently, and within the scope of the third embodiment, the first beam has a higher resonant frequency than that of the second beam.

Thus, the optical scanner according to the present invention makes it possible to scan the first surface, with the first scanner, at a relatively high frequency, for example to quickly detect a zone of interest and for being scanned this time with the second scanner. Scanning with the second scanner is then performed at a higher resolution in order to reveal details within the zone of interest that were unnoticed during the first scan. This resolution can especially be adjusted by the number and/or density of waveguides, and/or the light extraction device of each waveguide.

According to a second implementation, in addition or alternative to the first implementation, the first and second phased arrays are arranged so that the first range of lateral angles has a greater extent than that of the second range of lateral angles.

Still according to this second implementation, the second phased array has a higher resolution than that of the first phased array. This can especially be achieved by forming a second phased array that comprises a greater number (or greater density) of optical phase shifters than the first phased array.

The optical scanner is not limited to two elementary scanners and can comprise a greater number of them.

Figure 10:
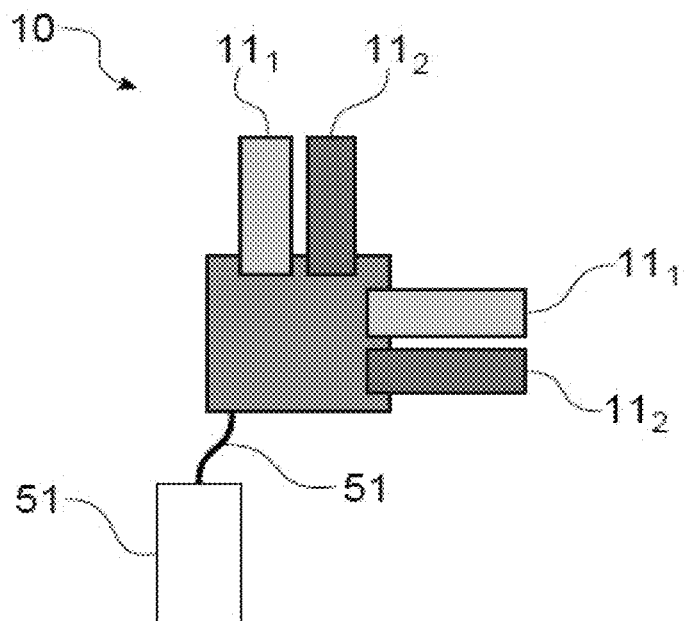
FIG. 10 is a schematic representation of an optical scanner provided with two pairs of elementary scanners.
Figure 11:
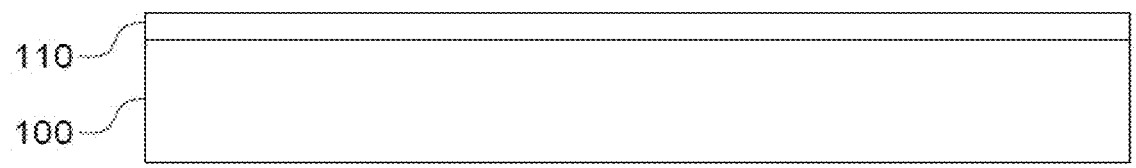
FIGS. 11, 12, 13, 14, 15, 16 are schematic representations of different steps likely to be implemented to make two beams of different thicknesses.
Figure 12:
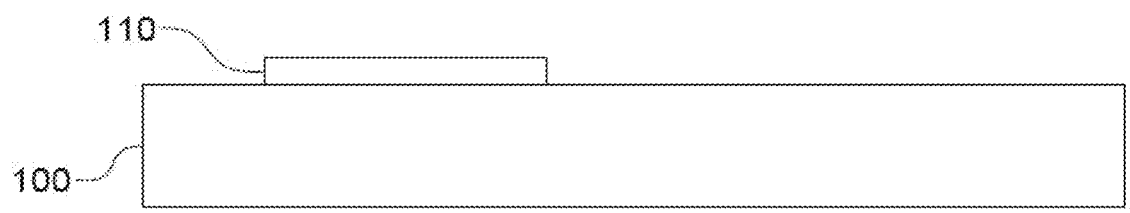
Figure 13:
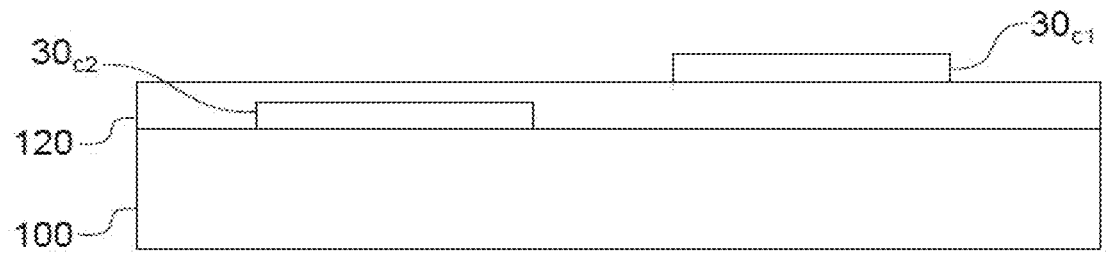
Figure 14:
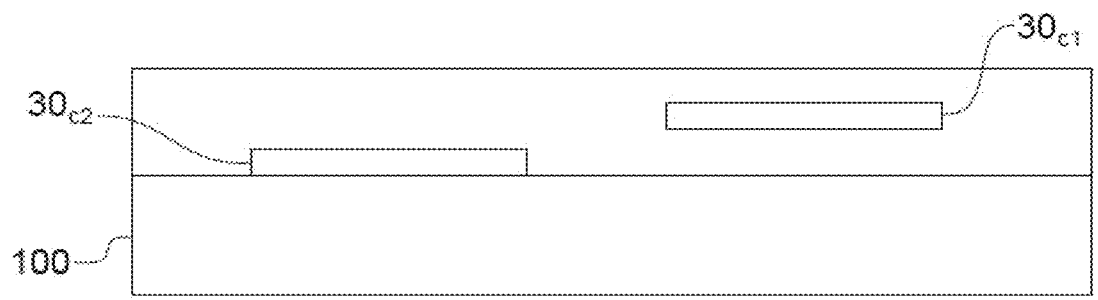
Figure 15:
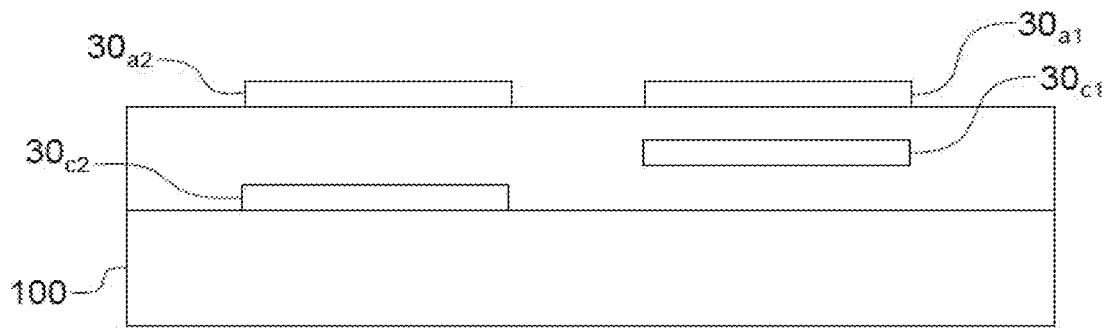
Figure 16:
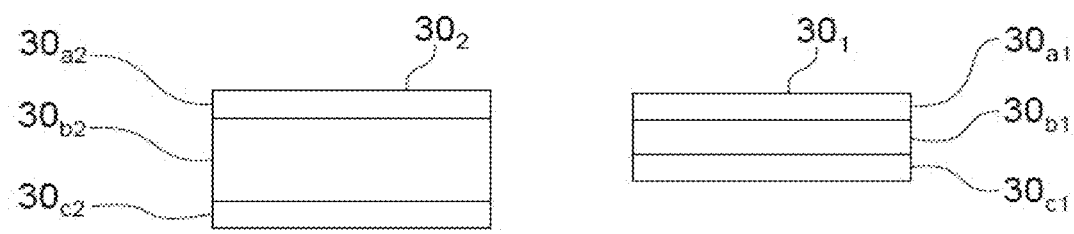

For example, FIG. 10 schematically represents an optical scanner with four elementary scanners, forming two pairs of elementary scanners. Each of the two pairs comprises a first scanner and a second scanner as described hereinabove.

The optical scanner according to the present invention thus makes it possible to address problems relating to the scan resolution while maintaining compactness of said scanner.

Furthermore, this optical scanner, which does not implement micro-mirrors, does not require alignment and remains simple to implement.

Furthermore, despite their differences, beams of the various elementary scanners can advantageously be formed collectively.

In this respect, FIGS. 11 to 16 represent steps of manufacturing a first beam and a second beam with different thicknesses and likely to be implemented in the context of a method for manufacturing an optical scanner.

The method comprises a step a) of forming a silicon oxide layer 110 by thermal oxidation of a silicon substrate 100.

This step a) is then followed by a step b) which comprises a photolithography/etching sequence for delimiting the second beam 302. The rest of the layer 110 after step b) forms the second rear layer $30c2$ of the second beam.

The whole is then covered with a layer of polysilicon 120 which is possibly flattened.

A step c) of forming the first rear layer $30c1$ is then performed. This step may especially involve, in this order, depositing a silicon oxide layer, and a photolithography/etching sequence in order to delimit the first rear layer $30_{c1}$ in said silicon oxide layer.

A step d) of forming another polycrystalline silicon layer is performed. This other layer overlaps the polycrystalline silicon layer and the first rear layer $30_{c1}$.

The first front layer $30_{a1}$ and the second front layer $30_{a2}$ are then formed upon performing a step e). This step can involve forming a silicon oxide layer followed by a photolithography/etching sequence.

An etching step f) can then be performed to release the first beam $30_1$ and the second beam $30_2$ which each have a different thickness.

The scanner 10 according to the present invention can advantageously be implemented in a small-sized image projector (for example a pico-projector) in mobile electronic equipment, and more particularly, a mobile phone, a connected watch, in intra-retinal projection equipment (for augmented reality).

The scanner can also be implemented in the context of 3D applications, especially 3D imaging.

The scanner 10 can also form the active part of a LIDAR, and for example be implemented in an autonomous vehicle.

REFERENCES

[1] Sven Holmstrom et al, "MEMS laser scanners: a review", Journal of Microelectromechanical Systems—April 2014, DOI: 10.1109/JMEMS.2013.2295470;
[2] Section 13.5.3 of Defay's work "Integration of Ferroelectric and Piezoelectric Thin Films";
[3] Jie Sun et al, "Large-scale nanophotonic phased array", Nature, 11727, vol 493, 195-199, January 2013.

The invention claimed is:

1. An optical scanner which comprises:
an optical source capable of emitting a main optical beam;
at least two elementary scanners, referred to as first and second scanners respectively, and which comprise:
a first and a second beam provided, respectively, with a first and a second movable part on the one hand, and a first and a second fixed parts on the other hand;
a first and a second actuator arranged to deform, respectively, the first and the second movable parts; and
a first and a second optical phased array disposed on or in the first and the second movable parts, respectively, and at which the main optical beam is partly extracted, as a first and a second beam, respectively;
the first and second scanners being arranged to scan, along a first and a second direction, by means of the first and second beams, respectively, a first and a second surface, the second surface being of smaller extent than the first surface and included in the first surface.

2. The optical scanner according to claim 1, wherein the first and second movable parts are arranged to undergo deformation, respectively, of a first and a second amplitude, the second amplitude being strictly smaller than the first amplitude.

3. The optical scanner according to claim 1, wherein the first movable part has a first thickness greater than a second thickness of the second movable part.

4. The optical scanner according to claim 1, wherein the first movable part has a first length smaller than a second length of the second beam.

5. The optical scanner according to claim 1, wherein the first movable part has a first resonant vibration frequency greater than a second resonant vibration frequency of the second movable part.

6. The optical scanner according to claim 1, wherein the first and second scanners comprise, respectively, a first and a second plurality of waveguides disposed on or in, respectively, the first and second movable parts, each of the plurality of waveguides configured to split the main optical beam into, respectively, a first and a second plurality of secondary optical beams.

7. The optical scanner according to claim 6, wherein the first plurality of waveguides comprises a smaller number of waveguides than that of the second plurality of waveguides.

8. The optical scanner according to claim 6, wherein the first and second optical phased arrays comprise, respectively, a first and second plurality of optical phase shifters, each optical phase shifter of the first and second pluralities of optical phase shifters being coupled to a waveguide, respectively, of the first and second pluralities of waveguides, and the second optical phased array comprises a greater number of optical phase shifters than the first optical phased array.

9. The optical scanner according to claim 8, wherein each optical phase shifter comprises a diffraction grating coupled to phase shifting means for imposing a phase shift to the secondary optical beam from the waveguide to which the optical phase shifter under consideration is optically coupled.

10. The optical scanner according to claim 1, wherein the first and second optical phased arrays are arranged to impose scanning of the first and second surfaces, respectively, by the first and second beams, respectively, along the second direction according to a first and a second range of lateral angles, respectively, the first range of lateral angles having a greater extent than that of the second range of lateral angles.

11. The optical scanner according to claim 1, wherein the first and second beams each comprises, from a front face to a rear face, a front layer, an intermediate layer and a rear layer.

12. The optical scanner according to claim 11, wherein the front layer and the rear layer each comprises a dielectric material.

13. The optical scanner according to claim 1, wherein the first and second actuators each comprises at least one of means selected from: electrostatic means, magnetic means, piezoelectric means, and thermal means.

14. The optical scanner according to claim 1, wherein the optical scanner also comprises a support on a main face of which the first and second beams rest through the first and second fixed parts.

15. The optical scanner according to claim 1, wherein the first and the second actuator are arranged to impose flexion, respectively, to the first and the second movable parts.

16. The optical scanner according to claim 1, wherein the first and the second actuator are arranged to impose torsion, respectively, to the first and the second movable parts.

17. The optical scanner according to claim 15, wherein the first and second beams are arranged such that the flexion of the first and second beams allows the first and second beams to scan, respectively, the first and second surfaces along the first direction, according to, respectively, a first and second range of longitudinal angles, the first range of longitudinal angles having a greater extent than the second range of longitudinal angles.

18. The optical scanner according to claim 15, wherein the first and second actuators are arranged such that the flexion imposed to both the first and second movable parts in made in a plane perpendicular to a main face of the first and second beams respectively.

* * * * *